US011544147B2

(12) United States Patent
Wang et al.

(10) Patent No.: US 11,544,147 B2
(45) Date of Patent: Jan. 3, 2023

(54) USING ERASURE CODING ACROSS MULTIPLE REGIONS TO REDUCE THE LIKELIHOOD OF LOSING OBJECTS MAINTAINED IN CLOUD OBJECT STORAGE

(71) Applicant: VMware, Inc., Palo Alto, CA (US)

(72) Inventors: Wenguang Wang, Santa Clara, CA (US); Junlong Gao, Santa Clara, CA (US); Vamsi Gunturu, Cupertino, CA (US)

(73) Assignee: VMWARE, INC., Palo Alto, CA (US)

( * ) Notice: Subject to any disclaimer, the term of this patent is extended or adjusted under 35 U.S.C. 154(b) by 263 days.

(21) Appl. No.: 16/882,338

(22) Filed: May 22, 2020

(65) Prior Publication Data
US 2021/0365319 A1 Nov. 25, 2021

(51) Int. Cl.
| G06F 11/10 | (2006.01) |
| G06F 11/07 | (2006.01) |
| G06F 11/30 | (2006.01) |
| G06F 16/16 | (2019.01) |
| G06F 12/02 | (2006.01) |

(52) U.S. Cl.
CPC ........ *G06F 11/1088* (2013.01); *G06F 11/076* (2013.01); *G06F 11/3034* (2013.01); *G06F 12/0246* (2013.01); *G06F 12/0253* (2013.01); *G06F 16/162* (2019.01); *G06F 16/164* (2019.01)

(58) Field of Classification Search
CPC ............... G06F 11/1088; G06F 11/076; G06F 11/3034; G06F 12/0246; G06F 12/0253; G06F 16/162; G06F 16/164; G06F 11/1076
See application file for complete search history.

(56) References Cited

U.S. PATENT DOCUMENTS

| 7,386,758 B2 | 6/2008 | Kitamura |
| 7,457,835 B2 | 11/2008 | Toebes et al. |
| 7,734,643 B1 | 6/2010 | Waterhouse et al. |
| 9,740,560 B2 | 8/2017 | Molaro et al. |
| 9,934,242 B2 | 4/2018 | Hunt et al. |
| 10,310,943 B2 | 6/2019 | Huang et al. |
| 10,592,335 B2 | 3/2020 | Hegde et al. |
| 10,650,035 B2 | 5/2020 | Maybee et al. |
| 10,747,465 B2 | 8/2020 | Shang et al. |

(Continued)

OTHER PUBLICATIONS

"Non-Final Office Actions issued in Related U.S. Appl. No. 16/882,327", dated Dec. 20, 2022, 7 pages.

(Continued)

*Primary Examiner* — Masud K Khan (57) ABSTRACT

Techniques for using erasure coding across multiple regions to reduce the likelihood of losing objects in a cloud object storage platform are provided. In one set of embodiments, a computer system can upload each of a plurality of data objects to each of a plurality of regions of the cloud object storage platform. The computer system can further compute a parity object based on the plurality of data objects, where the parity object encodes parity information for the plurality of data objects. The computer system can then upload the parity object to another region of the cloud object storage platform different from the plurality of regions.

18 Claims, 6 Drawing Sheets

(56) References Cited

U.S. PATENT DOCUMENTS

| | | | |
|---|---|---|---|
| 10,768,850 B2 | 9/2020 | Muniswamy-Reddy et al. | |
| 10,809,923 B2 | 10/2020 | Frank et al. | |
| 11,003,532 B2 | 5/2021 | Huang et al. | |
| 11,036,420 B2 | 6/2021 | Thoppil et al. | |
| 11,074,129 B2 | 7/2021 | Horn | |
| 11,093,139 B1 | 8/2021 | Karr et al. | |
| 11,150,986 B2 | 10/2021 | Li | |
| 2012/0173531 A1 | 7/2012 | Prahlad et al. | |
| 2012/0233463 A1* | 9/2012 | Holt | G06F 3/0644 713/168 |
| 2012/0233668 A1* | 9/2012 | Leafe | G06F 9/44526 709/226 |
| 2012/0303581 A1 | 11/2012 | Calder et al. | |
| 2014/0149351 A1 | 5/2014 | Bernbo et al. | |
| 2018/0341551 A1* | 11/2018 | Regni | G06F 11/1096 |
| 2019/0370170 A1* | 12/2019 | Oltean | G06F 3/0652 |
| 2020/0326858 A1 | 10/2020 | Fhoppil et al. | |
| 2020/0348865 A1 | 11/2020 | Danilov et al. | |
| 2021/0034380 A1 | 2/2021 | Chrisman | |
| 2021/0049076 A1 | 2/2021 | Danilov et al. | |
| 2021/0263795 A1* | 8/2021 | Li | G06F 11/1076 |
| 2021/0349793 A1 | 11/2021 | Wang et al. | |
| 2021/0365318 A1 | 11/2021 | Wang et al. | |
| 2021/0365365 A1 | 11/2021 | Wang et al. | |

OTHER PUBLICATIONS

"Non-Final Office Actions issued in Related U.S. Appl. No. 16/882,246", dated Dec. 22, 2022, 10 pages.
Final Office Action issued in Related U.S. Appl. No. 16/882,327, dated Mar. 31, 2022, 14 pages.
Final Office Action issued in Related U.S. Appl. No. 16/882,246, dated Jul. 22, 2022.
Notice of Allowance issued in Related U.S. Appl. No. 16/882,246, dated Oct. 5, 2022.

* cited by examiner

USING ERASURE CODING ACROSS MULTIPLE REGIONS TO REDUCE THE LIKELIHOOD OF LOSING OBJECTS MAINTAINED IN CLOUD OBJECT STORAGE

CROSS-REFERENCES TO RELATED APPLICATIONS

The present application is related to the following commonly-owned U.S. Patent Applications, filed concurrently herewith:
1. U.S. patent application Ser. No. 16/882,246 entitled "Using Erasure Coding in a Single Region to Reduce the Likelihood of Losing Objects Maintained in Cloud Object Storage;" and
2. U.S. patent application Ser. No. 16/882,327 entitled "Using Data Mirroring Across Multiple Regions to Reduce the Likelihood of Losing Objects Maintained in Cloud Object Storage."

The entire contents of these applications are incorporated herein by reference for all purposes.

BACKGROUND

Object storage is a data storage model that manages data in the form of logical containers known as objects, rather than in the form of files (as in file storage) or blocks (as in block storage). Cloud object storage is an implementation of object storage that maintains these objects on a cloud infrastructure, which is a server infrastructure that is accessible via the Internet. Examples of existing cloud object storage platforms include Amazon Simple Storage Service (S3), Microsoft Azure Storage, and Google Cloud Storage.

Cloud object storage generally offers higher durability and lower cost than other types of storage solutions, and thus is often used by enterprise customers to backup large volumes of data for disaster recovery and long-term retention/archival. For instance, Amazon guarantees an annual object durability of 99.999999999% for S3, which means there is a 0.000000001% chance that a customer will lose a given object stored in S3 in a given year. However, because this durability guarantee applies to each individual object, as the number of objects maintained in S3 increases, the likelihood that at least one of the objects will be lost also increases. This risk of object loss can grow to a significant level for customers that backup very large numbers of objects.

For example, consider a customer A that has 10 petabytes (PB) of data stored in S3, divided into objects which are each 4 megabytes (MB) in size (resulting in 2,684,354,560 total objects). In this case, the annual durability of customer A's objects will be $0.99999999999^{2684354560} = \sim 0.97$ (or 97%), which means there is a 3% chance that customer A will lose at least one of its objects per year. As a further example, consider a customer B that has 100 PB of data stored in S3, divided into the same 4 MB-sized objects (resulting in 26,843,545,600 total objects). In this case, the annual durability of customer B's objects will be $0.99999999999^{26843545600} = \sim 0.76$ (or 76%), which means there is a 24% chance that customer B will lose at least one of its objects per year.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof

1. Overview

Embodiments of the present disclosure are directed to techniques for using erasure coding across multiple regions of a cloud object storage platform to reduce the likelihood of losing objects maintained in that platform. As used herein, a "region" is a set of cloud infrastructure servers located within a defined geographic area (e.g., the Eastern U.S., the Western U.S., etc.) and a "region of a cloud object storage platform" is a region that hosts a portion of such a platform. "Erasure coding" is a data protection scheme that involves computing and storing parity information for groups of data fragments. Well-known erasure coding implementations in the field of distributed/multi-disk storage include Redundant Array of Independent Disks (RAID) level 5 (RAID-5) and RAID level 6 (RAID-6).

At a high level, the techniques of the present disclosure comprise grouping data objects to be uploaded to a cloud object storage platform into "virtual segments" and computing at least one parity object for each virtual segment that encodes parity information for the virtual segment's member data objects. This parity information can be understood as redundancy information that is dependent upon the data content of those member data objects (e.g., an XOR sum). The data objects and parity object of each virtual segment are then uploaded in a striped fashion to multiple regions of the cloud object storage platform, such that each data/parity object is stored in a different region.

At a later time, if an attempt to read a given data object O from a given region of the cloud object storage platform fails because O has become lost (i.e., corrupted or otherwise inaccessible), the other data and parity objects in data object O's virtual segment can be retrieved from their respective regions. Data object O can then be reconstructed using the retrieved data and parity objects, thereby allowing data object O to be successfully read (and thus effectively increasing the durability of data object O beyond the durability level guaranteed by the cloud object storage provider).

In addition, the techniques of the present disclosure include a novel process for garbage collecting data objects that have been uploaded in the striped fashion noted above via a "master" garbage collector component running in the region where the data objects' metadata resides and "slave" garbage collector components running in each region. With this master/slave configuration, the amount of data that is transferred between regions of the cloud object storage platform in order to carry out the garbage collection process can be kept low, which in turn minimizes the network bandwidth costs incurred for the process.

The foregoing and other aspects of the present disclosure are described in further detail in the sections that follow.

2. Example System Environment and Solution Architecture

Figure 1:
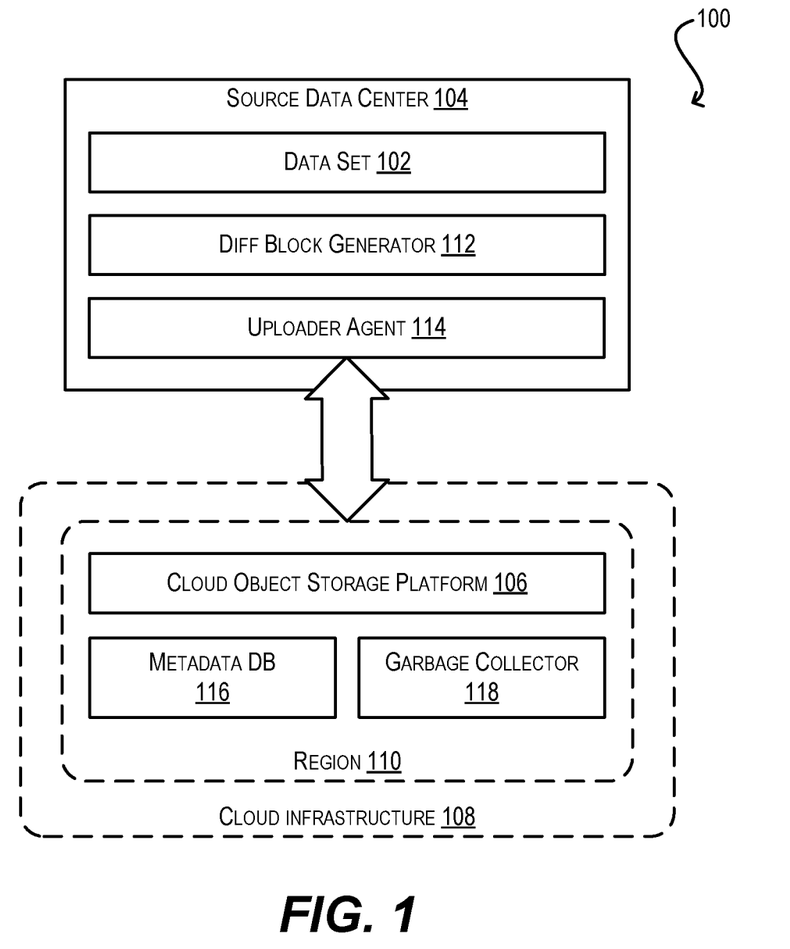
FIG. 1 depicts an example system environment.

To provide context for the embodiments presented herein, FIG. 1 depicts an example system environment 100 in which a data set 102 is periodically backed up from a source data center 104 to a cloud object storage platform 106 that is part of a cloud infrastructure 108. Data set 102 may be, e.g., a virtual disk file (VMDK), a hyper-converged infrastructure (HCI) storage object, or any other collection of data that consists of a base version and multiple delta versions comprising updates/modifications made to data set 102 over time. Source data center 104 may be operated by a customer of cloud object storage platform 106/cloud infrastructure 108, such as an enterprise. Cloud object storage platform 106/cloud infrastructure 108 may be operated by a third-party cloud service provider, such as Amazon, Microsoft, Google, or the like.

As shown, cloud object storage platform 106 is deployed in a region 110, which is a set of servers or data centers of cloud infrastructure 108 that are clustered in a particular geographic area. Examples of such geographic areas include the Eastern U.S., the Western U.S., South America, and so on. Although only a single region is depicted in FIG. 1 for simplicity of illustration, cloud infrastructure 108 will typically include a plurality of geographically dispersed regions (to ensure that global customers of cloud infrastructure 108 are relatively close to at least one region) and cloud object storage platform 106 will typically be deployed across several, if not all, of those regions. In the example of FIG. 1, region 110 is assumed to be the region that is geographically closest to source data center 104, and thus source data center 104 is configured to backup data set 102 to the portion of cloud object storage platform 106 deployed in region 110.

To carry out this backup process, source data center 104 includes a diff block generator 112 and an uploader agent 114. In operation, diff block generator 112 identifies logical data blocks in data set 102 that have been modified and provides those logical data blocks to uploader agent 114. In response, uploader agent 114 packages the logical data blocks into objects (referred to herein as "data objects") which conform to the object format of cloud object storage platform 106 and uploads the data objects to region 110 of platform 106. Uploader agent 114 also determines file system metadata changes arising out of the data block modifications, packages the metadata changes into "metadata objects," and uploads the metadata objects to a separate metadata database 116 deployed in region 110.

For purposes of the present disclosure, it is assumed that each data object uploaded to cloud object storage platform 106 has a moderately large (but not too large) fixed size, such as 4 MB (subject to a certain degree of variation due to compression and other factors). This helps reduce the API (application programming interface) costs of uploading data to platform 106 because (1) many cloud object storage platforms charge a fee for each service API invoked against the platform, and (2) uploading data in the form of larger, rather than smaller, objects decreases the number of upload (i.e., PUT) APIs that need to be invoked, which in turn keeps API costs low. At the same time, avoiding a very large object size reduces the overhead of performing object garbage collection (explained below).

In addition, for various reasons, it is assumed that the uploaded data objects are maintained in cloud object storage platform 106 using a log-structured file system (LFS) disk layout. As known in the art, an LFS is a file system in which data is not overwritten in place on disk; instead, each time an update is made to a piece of data, the latest version of that data is written to a new physical disk location in a sequential log format (and thus any older versions of that data remain, at least temporarily, on disk). In the context of FIG. 1, this means that as modifications are made to the logical data blocks of data set 102, uploader agent 114 packages the modified data blocks into new data objects (having, e.g., monotonically increasing log sequence numbers) and uploads those new data objects to cloud object storage platform 106. without overwriting previously uploaded data objects.

Figure 2:
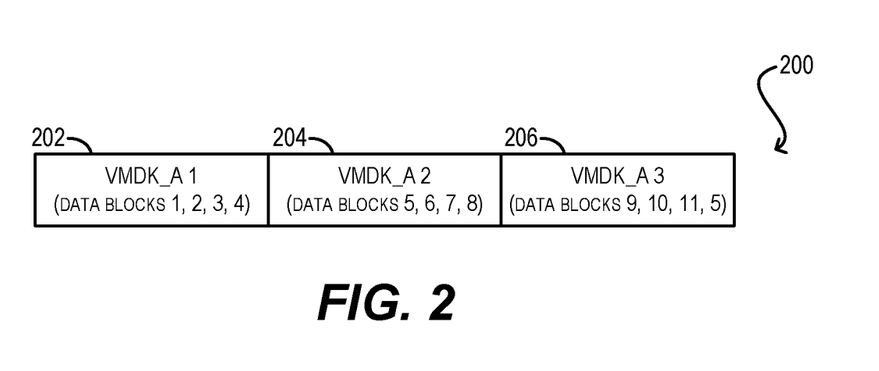
FIG. 2 depicts a log of data objects.

By way of example, FIG. 2 depicts a log of data objects 200 that may be created, via uploader agent 114, in region 110 of cloud object storage platform 106 for a data set named "VMDK_A." As shown in FIG. 2, log 200 includes a first data object "VMDK_A 1" (reference numeral 202) that comprises the data content of logical data blocks 1, 2, 3, and 4 of VMDK_A, a second data object "VMDK_A 2" (reference numeral 204) that comprises the data content of logical data blocks 5, 6, 7, and 8 of VMDK_A, and a third data object "VMDK_A 3" (reference numeral 206) that comprises the data content of logical data blocks 9, 10, 11, and 5 of VMDK_A. The number specified in the name of each data object indicates the sequence of that object within log 200. Because logical data block 5 appears twice within log 200 (once in VMDK_A 2 and again in VMDK_A 3), the version of data block 5 in the latest/highest-numbered data object VMDK_A 3 is considered the "live," or most current, version of this data block. In contrast, the version of data block 5 in older data object VMDK_A 2 is considered a "dead" version because it has been superseded by the version in newer data object VMDK_A 3.

One consequence of employing an LFS as described above is that, over time, some data objects in cloud object storage platform 106 will accumulate a high percentage of dead data blocks and therefore consume an unnecessary amount of storage space in the platform. To mitigate this, a garbage collector component 118 is implemented in region 110 for garbage collecting (or in other words, "segment cleaning") these data objects. In various embodiments, garbage collector 118 identifies, via metadata database 116, data objects in region 110 of cloud object storage platform 106 that are candidates for cleaning (e.g., data objects that have a relatively large number of dead data blocks and/or exceed a threshold age). Then, for each of the candidate data objects, garbage collector 118 determines the live data blocks remaining in the data object, reads the live data blocks, and writes out the live data blocks to a brand new data object in region 110. Upon completing this process, garbage collector 118 marks the candidate data objects for deletion, thereby reclaiming the storage space consumed by those objects.

As discussed in the Background section, the providers of cloud object storage platforms such as platform 106 of FIG. 1 often guarantee a certain level of durability for the objects maintained on their platforms. For example, with respect to Amazon S3, Amazon guarantees "11 nines" of object durability (or 99.999999999%), which means there is only a 0.000000001% chance that each object stored in S3 will fail in a given year. While this level of durability appears impressive, because it applies to each individual object (rather than collectively to all objects), as the number of objects uploaded to S3 increases, the likelihood of losing at least one of those objects will also increase. As a result, customers that upload extremely large numbers of objects face a significant risk of object loss (e.g., an annual 24% chance of loss for a customer that uploads 100 PB of data in the form of 4 MB objects).

One way of increasing the durability of objects maintained in a cloud object storage platform is to employ erasure coding to compute and upload a parity object for every X data objects uploaded to a single region R of the platform. With this approach, referred to as "single region erasure coding" and detailed in commonly-owned U.S. patent application Ser. No. 16/882,246, a lost data object can be reconstructed from the other data/parity objects of that object's erasure coding group in region R.

However, in order to be effective, single region erasure coding generally requires that object failures within each cloud object storage region occur on an independent, or uncorrelated, basis, and this is not the case for several existing cloud object storage platforms. For instance, in Amazon S3, if an object is lost in one region, there is a relatively high likelihood that other objects stored in that same region will also be lost. Thus, maintaining an entire erasure coding group of objects in a single S3 region will not necessarily increase the durability of the objects within that group, because there is a significant chance that multiple objects in the group will be lost together (thereby preventing the reconstruction of any of the lost objects).

Another way of increasing object durability in a cloud object storage platform is to upload mirror copies of data objects to multiple regions of the platform. With this approach, referred to as "multi-region data mirroring" and detailed in commonly-owned U.S. patent application Ser. No. 16/882,327, if a data object is lost in a first region R1, a mirror copy of that data object can be retrieved from another region R2. Therefore, this approach does not require object failures within a single region to be independent like single region erasure coding; instead, to be effective, this approach simply requires that object failures across different regions be independent (which is typically the case for existing cloud object storage platforms).

However, while multi-region data mirroring resolves this deficiency of single region erasure coding, multi-region data mirroring also significantly increases the storage cost/usage of maintaining the data objects in the cloud object storage platform (e.g., double the storage cost/usage for two-way mirroring, triple the storage cost/usage for three-way mirroring, and so on). This increase can become problematic for very large numbers of objects.

Figure 3:
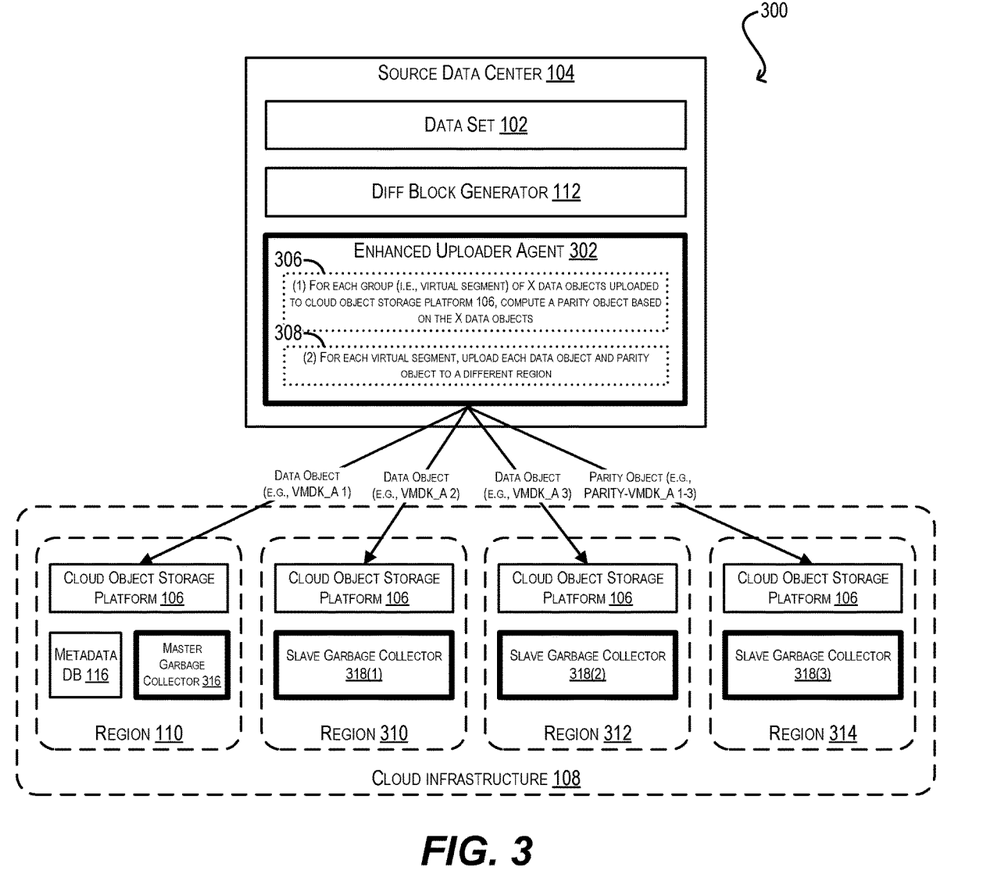
FIG. 3 depicts a modified version of the system environment of FIG. 1 according to certain embodiments.
Figure 4:
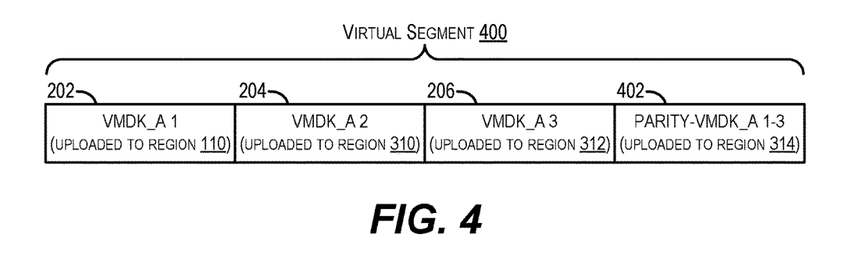
FIG. 4 depicts a virtual segment according to certain embodiments.

To address the foregoing and other similar problems, FIG. 3 depicts a modified version of system environment 100 of FIG. 1 (i.e., system environment 300) that includes, inter alia, an enhanced uploader agent 302 within source data center 104. As shown, at the time of uploading data objects to cloud object storage platform 106, enhanced uploader agent 302 can compute a parity object for each group of X sequential data objects (referred to as a "virtual segment") that encodes parity information regarding the data content of these objects (step (1); reference numeral 306). In one set of embodiments, enhanced uploader agent 302 can compute one parity object for every three data objects in a manner similar to 3+1 RAID-5. This option is illustrated in FIG. 4, which depicts a virtual segment 400 comprising the three data objects of FIG. 2 (i.e., VMDK_A 1, VMDK_A 2, and VMDK_A 3) and a parity object "PARITY-VMDK_A 1-3" (reference numeral 402) computed from those three data objects. In alternative embodiments, enhanced uploader agent 302 may use any other reasonable erasure coding schema, such as two parity objects for every four data objects (similar to 4+2 RAID-6), one parity object for every 5 data objects (similar to 5+1 RAID-5), etc.

Enhanced uploader agent 302 can then upload the data objects and parity object in each virtual segment in a striped fashion across multiple regions of cloud object storage platform 106, such that each data or parity object of the virtual segment is uploaded to a different region (step (2); reference numeral 308). For instance, as shown in FIGS. 3 and 4, a first data object of virtual segment 400 (e.g., VMDK_A 1) is uploaded to a first region 110, a second data object of virtual segment 400 (e.g., VMDK_A 2) is uploaded to a second region 310, a third data object of virtual segment 400 (e.g., VMDK_A 3) is uploaded to a third region 312, and the parity object of of virtual segment 400 (PARITY-VMDK_A 1-3) is uploaded to a fourth region 314.

With these data and parity objects in place across regions 110, 310, 312, and 314, if source data center 104 (or some other storage client, such as a secondary/backup data center) subsequently attempts to read, e.g., data object VMDK_A 1 uploaded to region 110 but fails to do so because that data object has become lost, the other data and parity objects of virtual segment 400 can be retrieved from the other regions 310, 312, and 314. The lost data object can then be reconstructed using the retrieved data and parity objects (in accordance with conventional erasure coding reconstruction algorithms), thereby allowing the lost data object to be successfully read. Accordingly, this solution approach and architecture advantageously increases the overall object durability of cloud object storage platform 106, beyond any durability guarantees that may be provided at the platform level by the cloud object storage provider.

Further, because the components of each virtual segment are maintained in completely different regions, this solution approach/architecture does not require object failures to be independent within a given region like the single region erasure coding approach. Instead, it is sufficient for object failures to be independent across regions.

Yet further, because the storage overhead of erasure coding is significantly less than data mirroring, this solution approach/architecture achieves the foregoing advantages with much lower storage cost/usage than the multi-region data mirroring approach. For example, the storage overhead of a 3+1 erasure coding schema is 33% in comparison to a storage overhead of 100% for two-way mirroring.

One complication with the multi-region erasure coding approach shown in FIG. 3 is that, because the data objects of data set 102 are spread across multiple regions of cloud object storage platform 106, the garbage collection process requires garbage collecting data objects in each of these multiple regions. However, the conventional garage collection process described with respect to FIG. 1 involves a single garbage collector component (i.e., garbage collector 118) running within a single region of cloud infrastructure 108 (i.e., region 110). This means that if garbage collector 118 of region 110 is used to garbage collect data objects stored in, for example, region 310, 312, or 314, it must do so in a remote manner, which will generate a significant amount of cross-region network traffic. This is undesirable because many cloud service providers charge a relatively high bandwidth cost for every gigabyte (GB) of data transferred across the regions of their cloud infrastructures.

To deal with this concern, system environment 300 of FIG. 3 further includes a novel garbage collection architecture comprising a master garbage collector component 316 located in region 110 (i.e., the region where metadata database 116 recites) and a slave garbage collector component 318 located in each region 110, 310, 312, and 314. Garbage collector component 316 is referred to as the "master" garbage collector because it is configured to orchestrate the garbage collection process by accessing metadata database 116.

As detailed in section (4) below, at the time of initiating garbage collection with respect to the data objects uploaded by enhanced uploader agent 304, master garbage collector 316 can determine, by referencing metadata database 116, which data objects across the regions of cloud object storage platform 106 are candidates for garbage collection. Then, instead of directly garbage collecting those candidate data objects in each region, master garbage collector 316 can exchange metadata regarding the candidate data objects with slave garbage collectors 318.

Through this exchange of metadata, slave garbage collectors 318 can locally garbage collect the candidate data objects in their own respective regions (as well as re-compute any parity objects as needed). Because the metadata exchanged between master garbage collector 316 and slave garbage collectors 318 is much smaller than the data traffic that would be generated if master garbage collector 310 were to directly manipulate the data objects in remote regions, this architecture results in significantly less cross-region bandwidth use than conventional approaches and therefore significantly reduces the cost of carrying out garbage collection.

It should be appreciated that system environment 300 of FIG. 3 is illustrative and not intended to limit embodiments of the present disclosure. For instance, in some embodiments, a portion (or all) of the functionality attributed to enhanced components 302, 316, and 318 may be implemented at different locations in system environment 300. Further, the various components shown in system environment 300 may include sub-components and/or functions that are not specifically described. One of ordinary skill in the art will recognize other variations, modifications, and alternatives.

3. Enhanced Uploader Agent Workflow

Figure 5:
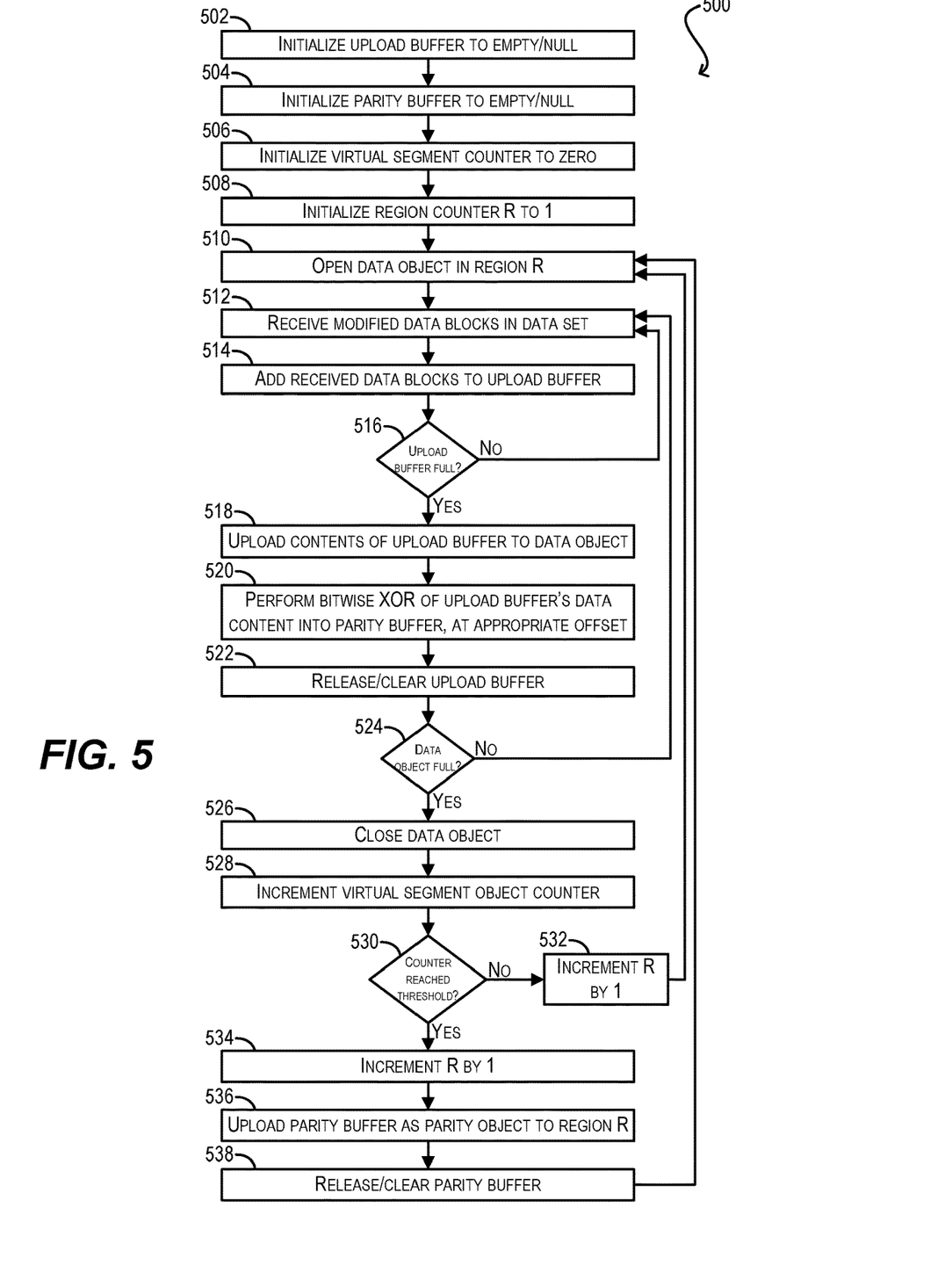
FIG. 5 depicts an upload workflow according to certain embodiments.

FIG. 5 depicts a workflow 500 that provides additional details regarding the processing that may be performed by enhanced uploader agent 302 of FIG. 3 for uploading data set 102 from source data center 104 to cloud object storage platform 106 using multi-region erasure coding according to certain embodiments. For efficiency reasons, workflow 500 assumes that enhanced uploader agent 302 uploads data in a streaming fashion using "chunks" that are smaller in size than a data object (e.g., 64 KB chunks). However, in alternative embodiments this chunk-based streaming can be omitted. In addition, workflow 500 assumes that for each virtual segment uploaded, the parity object of the virtual segment is always uploaded to the same region. However, in other embodiments the parity objects may be rotated across different regions for different virtual segments (which prevents any single region from becoming a bottleneck for accessing/updating the parity objects).

Starting with steps 502 and 504, enhanced uploader agent 302 can initialize an upload buffer and a parity buffer to empty/null, where the size of the upload buffer is equal to the size of a single chunk (e.g., 64 KB) and the size of the parity buffer is equal to the size of a single data object (e.g., 4 MB). In addition, at steps 506 and 508, enhanced uploader agent 302 can initialize a virtual segment object counter to zero and a region counter R to 1.

At step 510, enhanced uploader agent 302 can open (or in other words, initialize for writing) a new data object in region R of cloud object storage platform 106 (assuming the regions of platform 106 are sequentially numbered). In one set of embodiments, the data object that is opened at step 510 can have an object name that consists of the name of data set 102 and a number indicating the current LFS log sequence for the object with respect to the data set.

At step 512, enhanced uploader agent 302 can receive, from diff block generator 112, one or more logical data blocks that have been modified in data set 102. Enhanced uploader agent 302 can then add the data block(s) to the upload buffer (step 514) and check whether the upload buffer is now full (step 516).

If the answer at step 516 is no, enhanced uploader agent 302 can return to step 512 in order to receive additional modified data blocks from diff block generator 112. However, if the answer at step 516 is yes, enhanced uploader agent 302 can upload (i.e., write) the contents of the upload buffer to the opened data object in region R (step 518). In addition, enhanced uploader agent 302 can perform a bit-wise XOR of the upload buffer's data content into the parity buffer at an appropriate offset, thereby incorporating that data content into the parity object that will ultimately be uploaded for the virtual segment of the opened data object (step 520). For example, if the current chunk is the second chunk uploaded for the data object, the data content of the upload buffer can be XOR'ed into the parity buffer starting at an offset of 64 KB.

Upon completing the XOR operation, enhanced uploader agent 302 can release/clear the upload buffer (step 522) and check whether the opened data object is now full (e.g., has reached its predefined size of 4 MB) (step 524). If the answer is no, enhanced uploader agent 302 can return to step 512.

However, if the answer at step 524 is yes, enhanced uploader agent 302 can close the data object opened at step 510 (step 526), increment the virtual segment object counter by 1 (step 528), and check whether the virtual segment object counter has reached a threshold X, where X is the number of data objects to be included in each virtual segment (step 530). If not, enhanced uploader agent 302 can increment region counter R by 1 (step 532) and return to step 510 in order to open a new data object in another region.

If the answer at block 530 is yes, enhanced uploader agent 302 can conclude than an entire virtual segment of data objects has been uploaded and thus can increment region counter R by 1 (step 534) and upload the content of the parity buffer as a new parity object for that virtual segment to region R, with an appropriate object name (step 536). For example, as shown in FIG. 4, if the names of the data objects in the uploaded virtual segment are VMDK_A 1 (uploaded to region 110), VMDK_A 2 (uploaded to region 310), and VMDK_A 3 (uploaded to region 312), the name of the parity object for that virtual segment can be PARITY-VMDK_A 1-3 (uploaded to region 314).

Finally, enhanced uploader agent 302 release/clear the parity buffer (step 538) and return to step 508 to reset the region counter and repeat the foregoing steps for the next virtual segment.

4. Garbage Collector Workflows

FIGS. 6, 7, 8, and 9 depict workflows 600, 700, 800, and 900 respectively that can be performed by master garbage collector 316 and slave garbage collectors 318 of FIG. 3 for garbage collecting data objects uploaded to the regions of cloud object storage platform 106 according to certain embodiments. In particular, workflow 600 can be executed by a main thread of main garbage collector 316, workflow 700 can be executed by a main thread of each slave garbage collector 318, workflow 800 can be executed by a helper thread of main garbage collector 316, and workflow 900 can be executed by a helper thread of each slave garbage collector 318. These workflows assume that each data object and parity object in a virtual segment has a "generation number" appended to the end of the object's name (e.g., VMDK_A 1-g1). This generation number is incremented whenever a data object is garbage collected (and thus its live data blocks are written to a new, smaller data object with the same name) or a parity object is updated to account for garbage collected data object(s) within its virtual segment.

Figure 6:
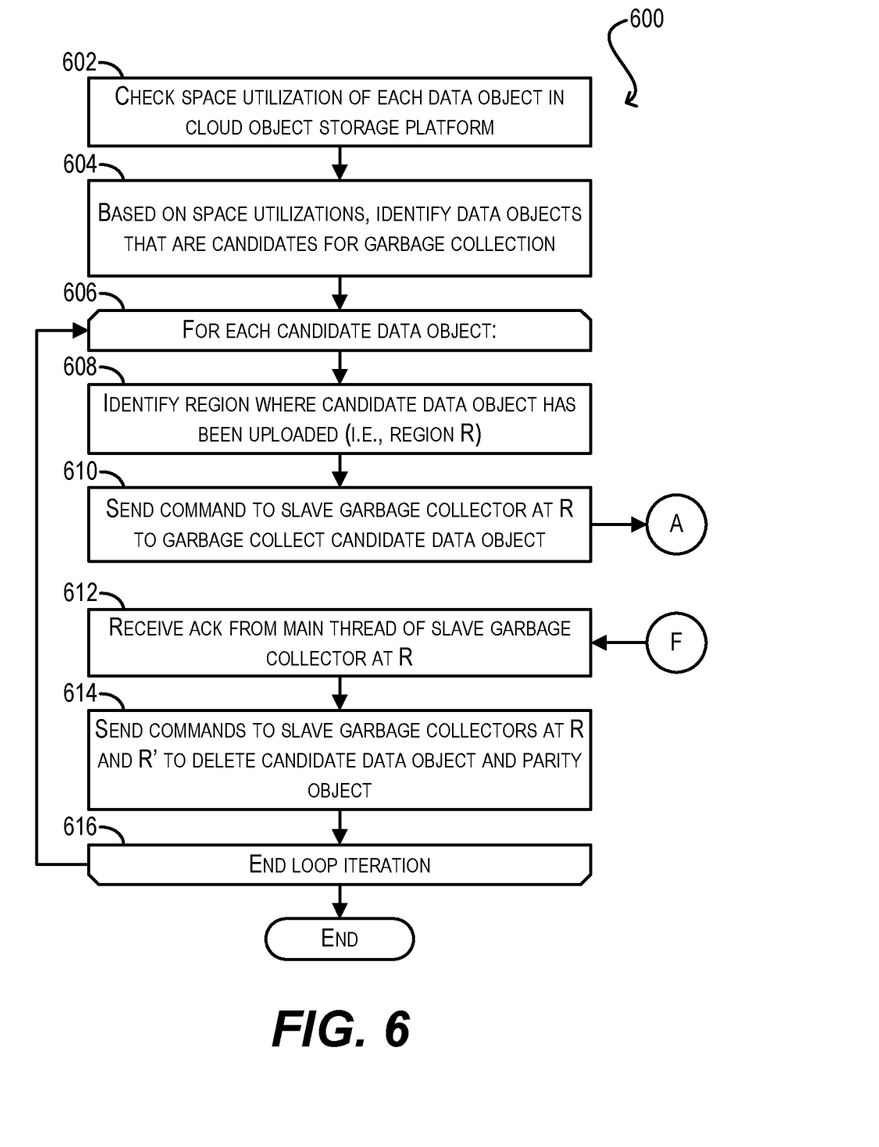
FIGS. 6, 7, 8, and 9 depict garbage collection workflows according to certain embodiments.

Starting with workflow 600, at steps 602 and 604, the main thread of master garbage collector 316 can check the space utilization of each data object uploaded to cloud object storage platform 106 and, based on these space utilizations, identify data objects that are candidates for garbage collection. In one set of embodiments, the space utilization check at step 602 can comprise accessing a segment usage table (SUT) in metadata database 116 to determine the number of live data blocks in each data object and the candidate identification at step 604 can comprise identifying those data objects whose percentage of live data blocks is below a threshold (e.g., 30%).

At step 606, the main thread of master garbage collector 316 can enter a loop for each candidate object identified at step 604. Within this loop, the main thread can identify, via metadata database 116, the region the candidate data object has been uploaded to (i.e., region R) (step 608) and send a command to the slave garbage collector 318 at region R to garbage collect the candidate data object (step 610).

Figure 7:
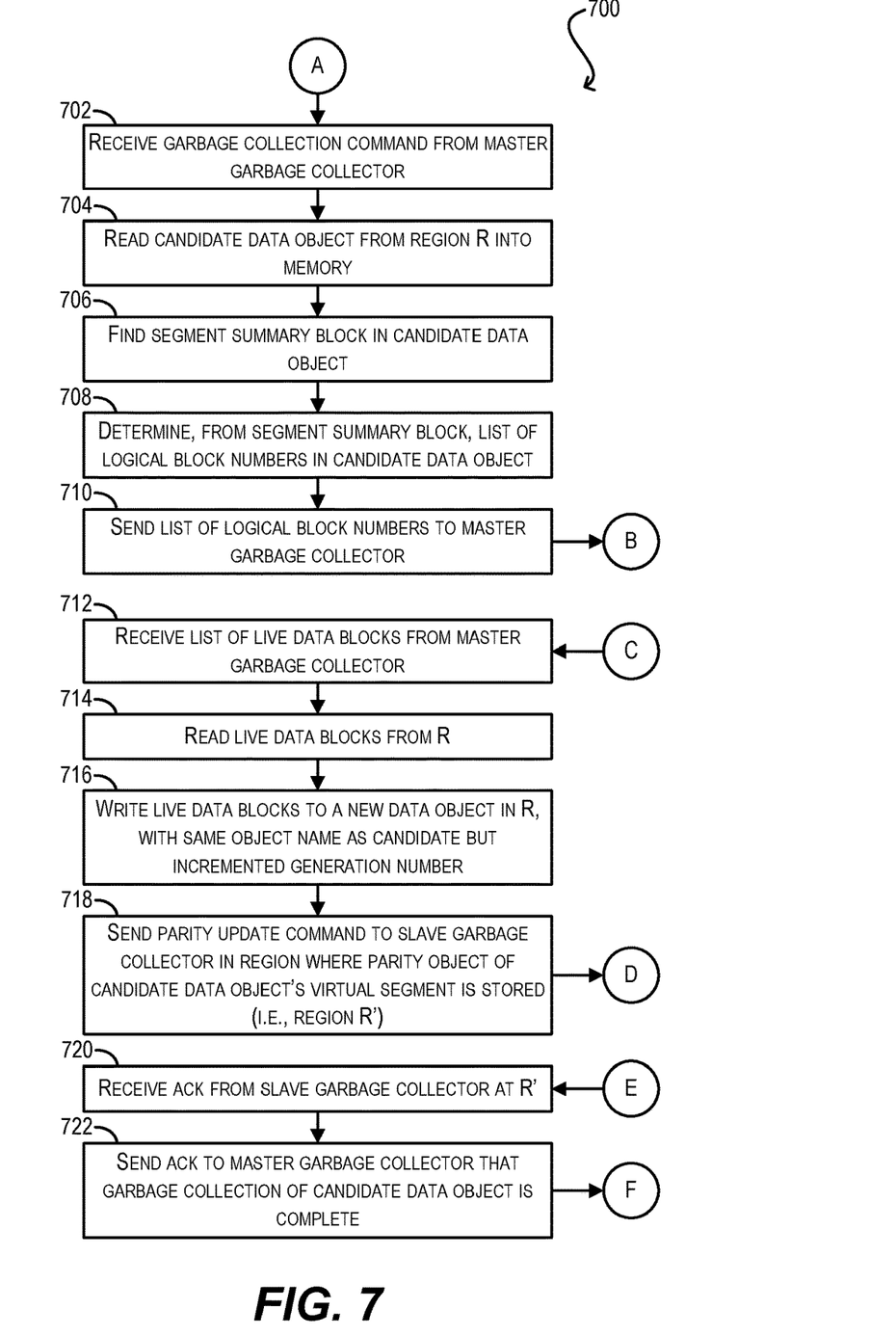
Figure 8:
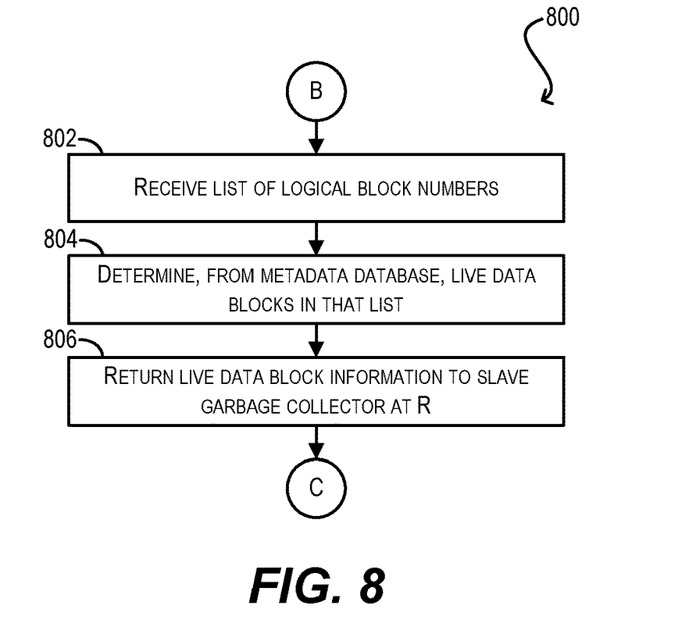

Turning now to workflow 700, at step 702, the main thread of slave garbage collector 318 at region R can receive the command sent by the master at step 610. In response, the main thread can read the candidate data object from region R into memory (step 704), find a segment summary block within the data object (step 706), and determine, from the segment summary block, a list of logical data block numbers included in this object (step 708). The main thread can then send the list of logical data block numbers to master garbage collector 316 (step 710), which causes the process to proceed to workflow 800.

At steps 802 and 804 of workflow 800, the helper thread of master garbage collector 316 can receive the list of logical data block numbers and determine, from metadata database 116, which of those logical data blocks are still live. Upon determining the live data blocks, the helper thread can return this information to the main thread of slave garbage collector 318 at region R (step 806).

Returning to workflow 700, at step 712, the main thread of slave garbage collector 318 at region R can receive the list of live data blocks. In response, it can read those live data blocks from region R (step 714) and write out the live data blocks to a new data object in R that has the same name as the candidate data object, but with an incremented generation number (step 716). For example, if the name of the candidate data object is VMDK_A 1-g1, the name of the new data object would be VMDK_A 1-g2. In this new data object, it assumed that all of the block locations corresponding to dead data blocks in the candidate data object are padded with zero.

Upon writing the new data object in region R, the main thread of slave garbage collector 318 can send a parity update command to the slave garbage collector in the region where the parity object of the candidate data object's virtual segment is stored (i.e., region R') (step 718). This parity update command can include an XOR sum of old and new data for the candidate data object and can instruct the receiving slave garbage collector to update the parity object.

Figure 9:
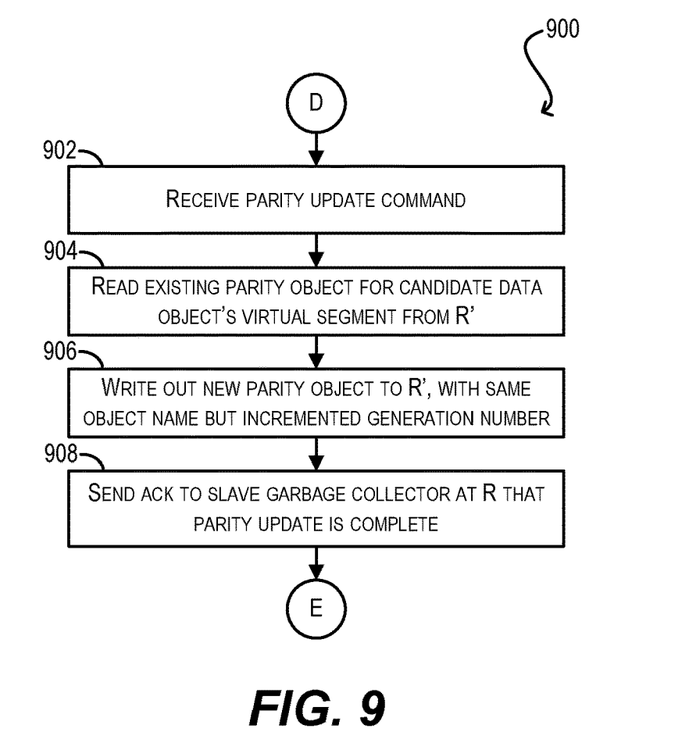

Turning now to FIG. 9, the helper thread of slave garbage collector 318 at region R' can receive the parity update command (step 902), read the existing parity object from region R' (step 904), and write out a new parity object to region R' based on the XOR information included in the parity update command, with the same object name but with an incremented generation number (step 906). The helper thread can then send an acknowledgment back to the main thread of slave garbage collector 318 at region R indicating that the parity object has been updated (step 908).

At steps 720 and 722 of workflow 700, the main thread of slave garbage collector 318 at region R can receive the acknowledgement send by the helper slave thread at region R' and can transmit an acknowledgement to master garbage collector 316 that the garbage collection of the candidate data object is now complete.

Returning now to workflow 600, at steps 612 and 614, the main thread of master garbage collector 316 can receive the acknowledgement and send commands to the slave garbage collectors in regions R and R' respectively to delete the candidate data object and the old parity object from those regions. Finally, master garbage collector 316 can reach the end of the current loop iteration (step 616) and repeat the foregoing process until all of the candidate data objects identified at step 604 have been garbage collected.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general-purpose computer system selectively activated or configured by program code stored in the computer system. In particular, various general-purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), persistent memory, NVMe device, a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method comprising:
uploading, by a computer system, each of a plurality of data objects to each of a plurality of regions of a cloud object storage platform;
computing, by the computer system, a parity object based on the plurality of data objects, the parity object encoding parity information for the plurality of data objects; and
uploading, by the computer system, the parity object to another region of the cloud object storage platform different from the plurality of regions,
wherein metadata for the plurality of data objects is maintained in a metadata database that resides solely at a first region of the cloud object storage platform, and
wherein the plurality of data objects are garbage collected in a manner that avoids transferring data content of the plurality of data objects across the plurality of regions.

2. The method of claim 1 further comprising:
attempting to read a data object in the plurality of data objects from the region of the cloud object storage platform to which the data object was uploaded; and
if the read attempt fails:
reading other data objects in the plurality of data objects from the regions to which the other data objects was uploaded;
reading the parity object from said another region;
reconstructing the data object based on the other data objects and the parity object.

3. The method of claim 1 wherein object failures within each of the plurality of regions are correlated.

4. The method of claim 1 wherein object failures across the plurality of regions are independent.

5. The method of claim 1 wherein a master garbage collector component runs at the first region, and
wherein the master garbage collector component:
identifies, by accessing the metadata database, at least one data object in the plurality of data objects as a candidate for garbage collection; and
transmits, to a slave garbage collector component running at a second region where the at least one data object was uploaded, a command to garbage collect the candidate data object.

6. The method of claim 5 wherein the master garbage collector component further:
receives, from the slave garbage collector component, a list of logical data block numbers included in the candidate data object;
determines, by accessing the metadata database, a range of live data blocks in the candidate data object;
transmits the range of live data blocks to the slave garbage collector component;
receives a garbage collection acknowledgment from the slave garbage collector component; and
in response to receiving the garbage collection acknowledgment, causes the candidate data object to be deleted.

7. A non-transitory computer readable storage medium having stored thereon program code executable by a computer system, the program code embodying a method comprising:
uploading each of a plurality of data objects to each of a plurality of regions of a cloud object storage platform;
computing a parity object based on the plurality of data objects, the parity object encoding parity information for the plurality of data objects; and
uploading the parity object to another region of the cloud object storage platform different from the plurality of regions,
wherein metadata for the plurality of data objects is maintained in a metadata database that resides solely at a first region of the cloud object storage platform, and
wherein the plurality of data objects are garbage collected in a manner that avoids transferring data content of the plurality of data objects across the plurality of regions.

8. The non-transitory computer readable storage medium of claim 7 wherein the method further comprises:
attempting to read a data object in the plurality of data objects from the region of the cloud object storage platform to which the data object was uploaded; and
if the read attempt fails:
reading other data objects in the plurality of data objects from the regions to which the other data objects was uploaded;
reading the parity object from said another region;
reconstructing the data object based on the other data objects and the parity object.

9. The non-transitory computer readable storage medium of claim 7 wherein object failures within each of the plurality of regions are correlated.

10. The non-transitory computer readable storage medium of claim 7 wherein object failures across the plurality of regions are independent.

11. The non-transitory computer readable storage medium of claim 7 wherein a master garbage collector component runs at the first region, and
wherein the master garbage collector component:
identifies, by accessing the metadata database, at least one data object in the plurality of data objects as a candidate for garbage collection; and
transmits, to a slave garbage collector component running at a second region where the at least one data object was uploaded, a command to garbage collect the candidate data object.

12. The non-transitory computer readable storage medium of claim 11 wherein the master garbage collector component further:

receives, from the slave garbage collector component, a list of logical data block numbers included in the candidate data object;

determines, by accessing the metadata database, a range of live data blocks in the candidate data object;

transmits the range of live data blocks to the slave garbage collector component;

receives a garbage collection acknowledgment from the slave garbage collector component; and in response to receiving the garbage collection acknowledgment, causes the candidate data object to be deleted.

13. A computer system comprising:

a processor; and a non-transitory computer readable medium having stored thereon program code that, when executed, causes the processor to:

upload each of a plurality of data objects to each of a plurality of regions of a cloud object storage platform;

compute a parity object based on the plurality of data objects, the parity object encoding parity information for the plurality of data objects; and upload the parity object to another region of the cloud object storage platform different from the plurality of regions, wherein metadata for the plurality of data objects is maintained in a metadata database that resides solely at a first region of the cloud object storage platform, and wherein the plurality of data objects are garbage collected in a manner that avoids transferring data content of the plurality of data objects across the plurality of regions.

14. The computer system of claim 13 wherein the program code further causes the processor to:

attempt to read a data object in the plurality of data objects from the region of the cloud object storage platform to which the data object was uploaded; and if the read attempt fails:

read other data objects in the plurality of data objects from the regions to which the other data objects was uploaded;

read the parity object from said another region;

reconstruct the data object based on the other data objects and the parity object.

15. The computer system of claim 13 wherein object failures within each of the plurality of regions are correlated.

16. The computer system of claim 13 wherein object failures across the plurality of regions are independent.

17. The computer system of claim 13 wherein a master garbage collector component runs at the first region, and wherein the master garbage collector component:

identifies, by accessing the metadata database, at least one data object in the plurality of data objects as a candidate for garbage collection; and transmits, to a slave garbage collector component running at a second region where the at least one data object was uploaded, a command to garbage collect the candidate data object.

18. The computer system of claim 17 wherein the master garbage collector component further:

receives, from the slave garbage collector component, a list of logical data block numbers included in the candidate data object;

determines, by accessing the metadata database, a range of live data blocks in the candidate data object;

transmits the range of live data blocks to the slave garbage collector component;

receives a garbage collection acknowledgment from the slave garbage collector component; and in response to receiving the garbage collection acknowledgment, causes the candidate data object to be deleted.

* * * * *